June 6, 1950  G. F. DALY  2,510,559
CARD FEEDING MECHANISM
Filed Nov. 19, 1945  10 Sheets-Sheet 1

INVENTOR
G. F. DALY
BY
ATTORNEY

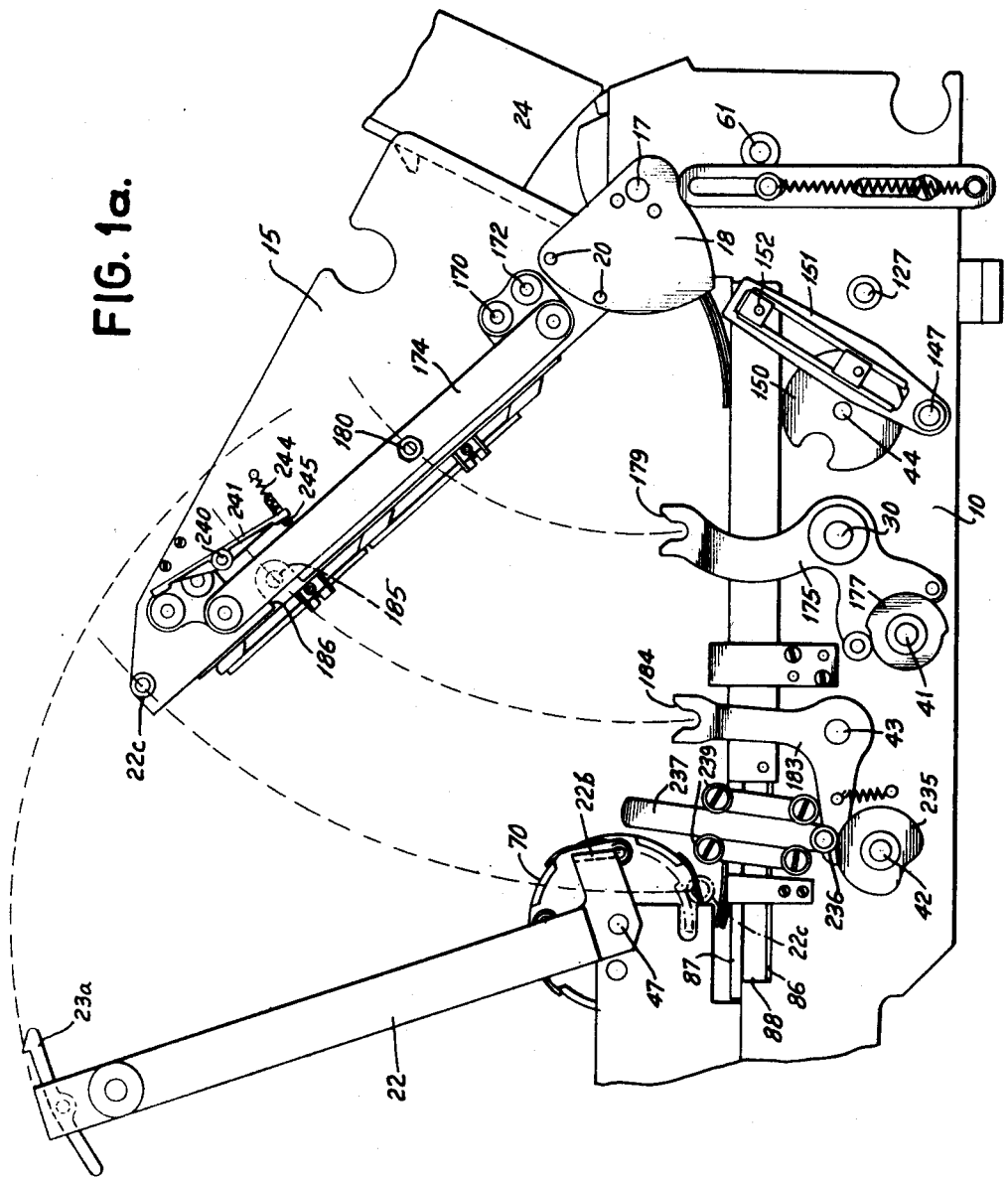

INVENTOR
G. F. DALY
BY
W. M. Wilson
ATTORNEY

INVENTOR
G. F. DALY
BY
ATTORNEY

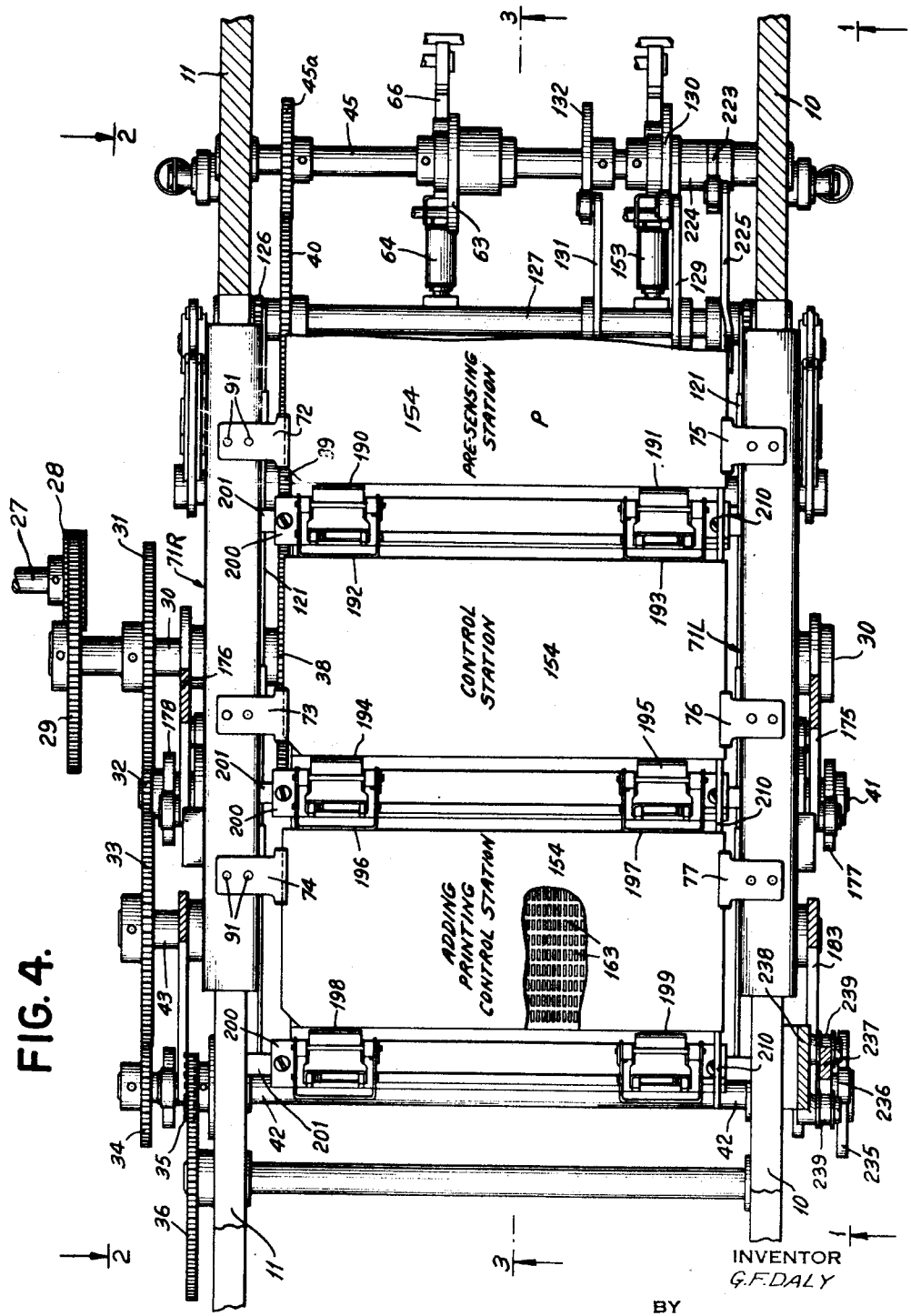

June 6, 1950     G. F. DALY     2,510,559
CARD FEEDING MECHANISM
Filed Nov. 19, 1945     10 Sheets-Sheet 6
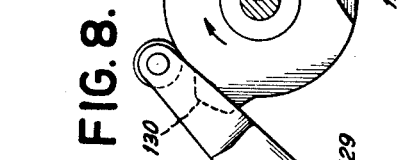
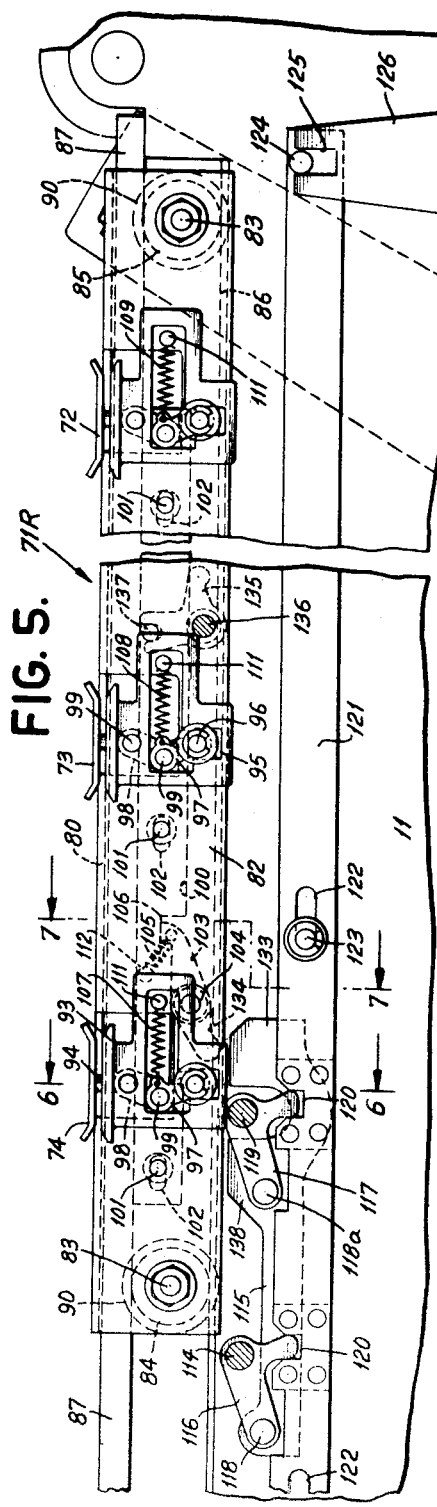
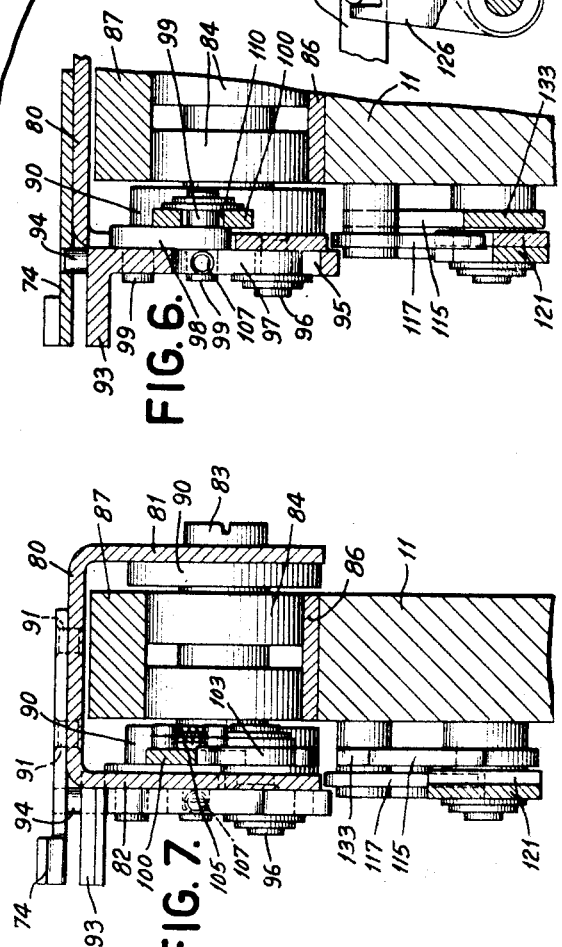
INVENTOR
G. F. DALY
BY
ATTORNEY June 6, 1950    G. F. DALY    2,510,559
CARD FEEDING MECHANISM
Filed Nov. 19, 1945    10 Sheets-Sheet 7

INVENTOR
G. F. DALY
BY
ATTORNEY

June 6, 1950　　　　　　G. F. DALY　　　　　　2,510,559
CARD FEEDING MECHANISM
Filed Nov. 19, 1945　　　　　　　　　　　　　10 Sheets-Sheet 8
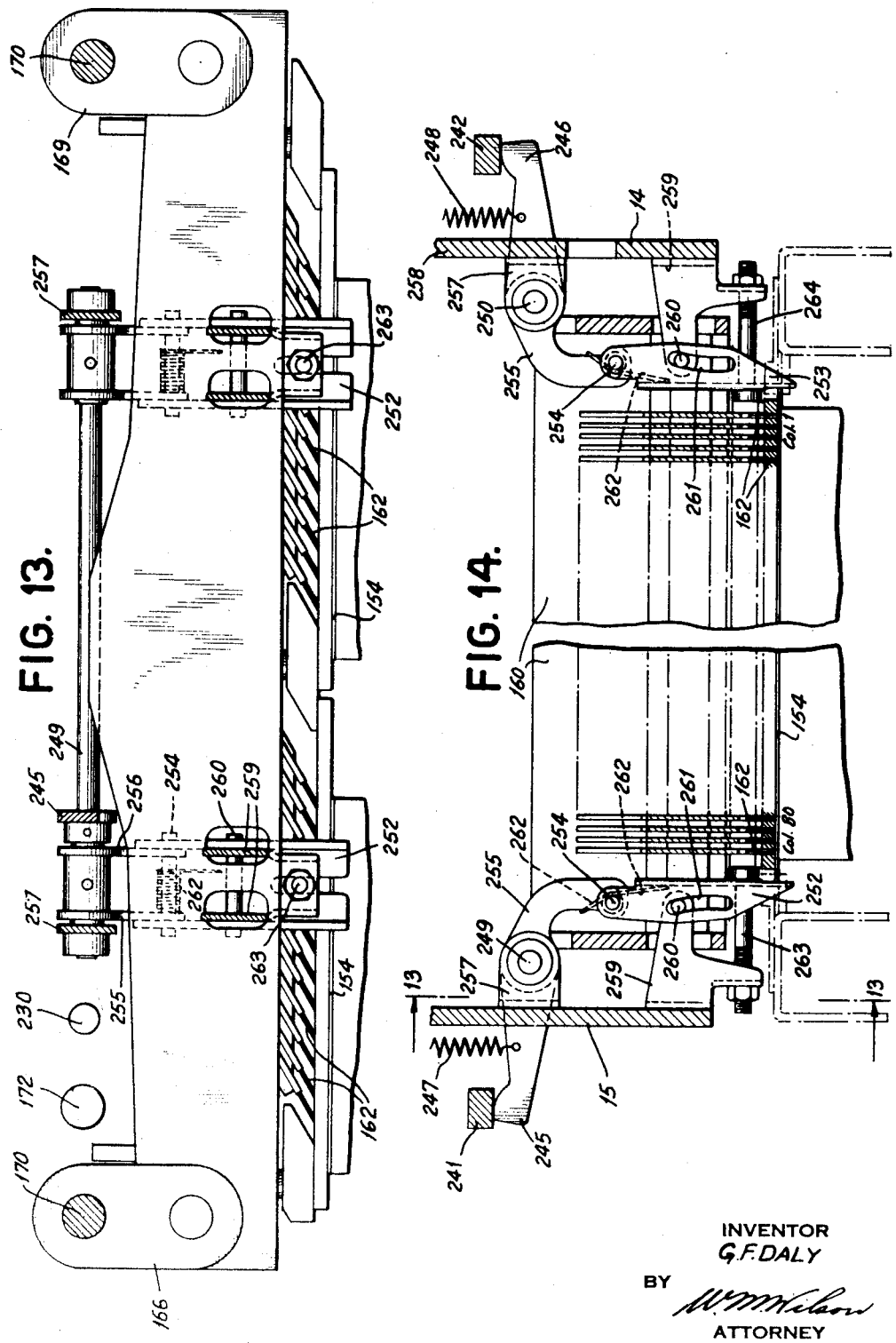
INVENTOR
G. F. DALY
BY
W. M. Wilson
ATTORNEY

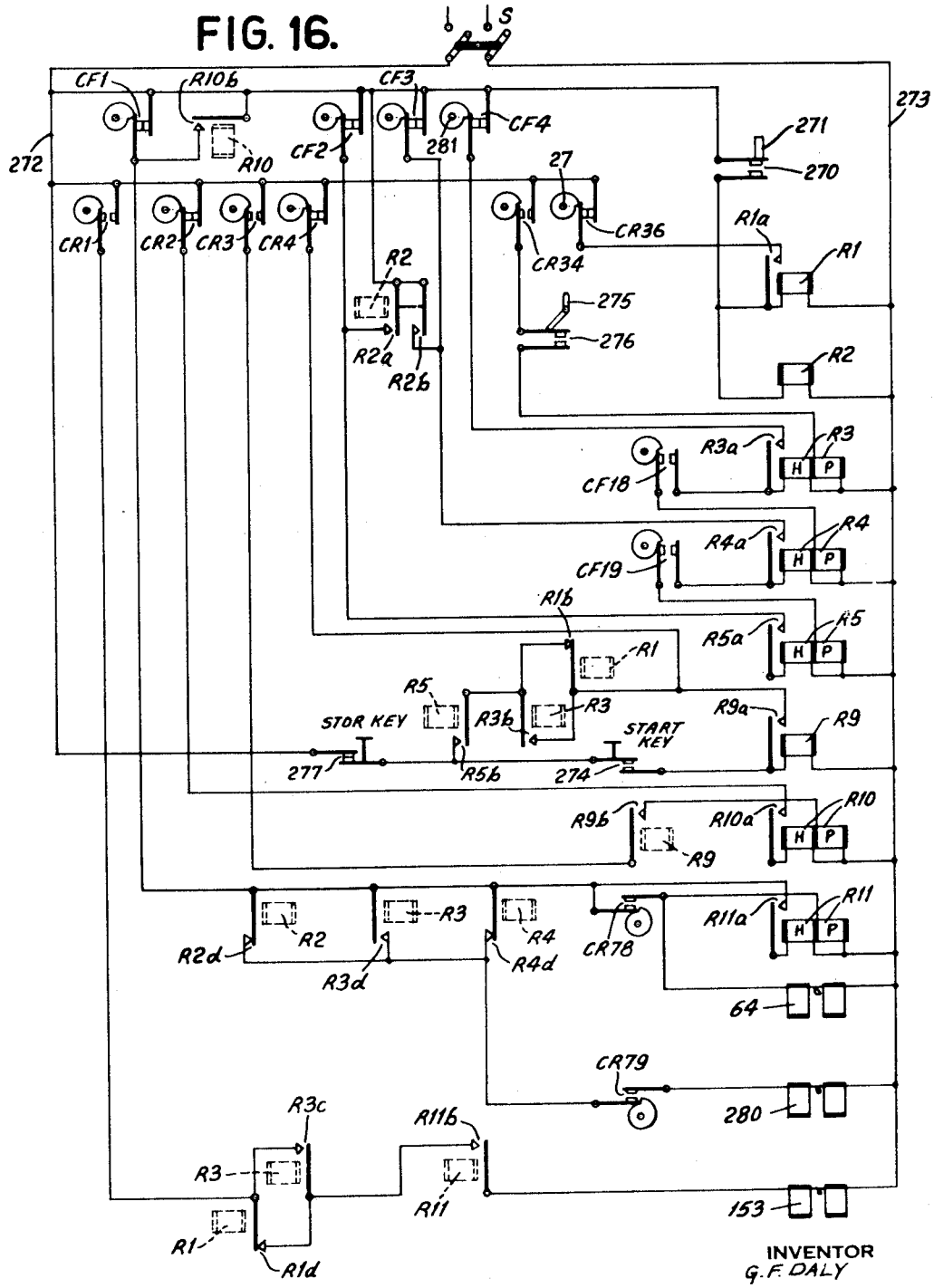

Patented June 6, 1950

2,510,559

UNITED STATES PATENT OFFICE 2,510,559

CARD FEEDING MECHANISM

George F. Daly, Endicott, N. Y., assignor to International Business Machines Corporation, New York, N. Y., a corporation of New York Application November 19, 1945, Serial No. 629,576

19 Claims. (Cl. 271—55)

This invention relates to sheet feeding mechanisms and principally to the type for successively feeding individual records, such as cards which are perforated to control functional operations of sorting, accounting machines or the like.

The principal object of the invention is to construct a card feeding mechanism and incorporate specific improvements therein which will cause it to operate efficiently, and provide the insurance that a card will be transported to the perforation analyzing mechanism in proper analyzing position and with such increased speed that the work to be performed by the machine can be accomplished in less time than heretofore. At the present time improvements are being incorporated in certain functional mechanisms in card controlled machines so that the functions thereof are carried out with increased speed and the purpose of this invention is to provide a card feed for such machines which will enable cards to pass through the machine not only with consistent speed but efficiently as well. Throughout the design parts have been constructed and correlated with the object that the characteristic of efficiency and requirement of high speed in operation will be attained by a simple and good construction.

A relatively important object of the invention is the provision of a presensing station between the card magazine and the card analyzing station which determines whether a card has been fed from a supply magazine and the provision of an associated control which inhibits further card feed operations of the machine until a card has issued from the supply magazine and the presensing station has sensed such fact, or the defective card has been replaced.

The importance of the preceding object is indicated by the fact that it has been found in practice that the majority of card jams and failure to feed to analyzing position occur at the throat block where the card is advanced by the pickers to the first pair of card feed rollers. Herein the presensing station checks the feed at this point to determine the presence or failure to feed a card from the supply magazine and hence with the majority of card jams or failures corrected the incorporation of this described improvement enables card feed with greater efficiency than heretofore.

A further object of the invention is to provide separately controlled means for the card picker operating mechanism and the gripper controlled card feed mechanism so that it is possible to inhibit further card feed in the next cycle from the supply magazine unless a card has issued from the supply magazine and to suppress card feed operations by the gripper mechanisms in the next cycle whenever the presensing station senses the fact that a card has not issued from the supply magazine.

Heretofore, the failure of a card to feed from the supply magazine at the throat did not suppress card feed of the preceding cards and they passed through the machine to function in the same manner as if the last card had been advanced through the machine. Obviously, when the card feed failure occurred before operations in connection with a card group were completed, the recorded report for a group of cards would be incomplete since in card controlled machines of the type in which the present invention is incorporated the passage of the last card through the machine causes a total to be recorded. Obviously, such total would be incomplete for the group of cards and hence the report would be incorrectly split. The provision of the presensing station and associated control herein for said separate card feeds is a novel and important feature in connection with card feed for such machines and prevents issuance of incomplete reports.

In the present machine, the control rendered effective by the presensing station suppresses the operation of the card picker mechanism and also the card gripper mechanisms; thereby completely suppressing these independent card feed operations. Hence, cards which precede the defective cards remain in analyzing position and recording functions under their control are inhibited so that a total cannot be taken and the aforesaid "splitting" of the groups is eliminated. In the present arrangement it is possible to facilitate manual replacement of the defective card and for advancing this card to its correct analyzing position in the card feed unit before resuming operation of the machine. When resumption of the machine is initiated cards will then be fed in the normal manner and the report will be made out complete, just as if there was no failure of card feed.

A further object of the invention is the provision of means to positively grip cards at their marginal side edges by grippers carried by reciprocating gripper frames and to move the frames with an accelerated card transport stroke and a relatively slower return stroke.

Another feature of the invention is the provision of releasable grippers carried by the above described gripper frames which, when opened prior to said slow return stroke, will leave the cards at rest in analyzing position. With cards analyzed at rest, in contrast to analyzing them in motion, additional functions can be carried out by the machine in which the improved card feed unit is incorporated.

Another object of the invention is the provision of improved card aligners which align the cards at all four edges. One set of aligners shifts the card to proper analyzing position by correcting any deviation of the card from its proper direction or line of feed. The other set corrects over and under feed of the card by the grippers, while both sets compensate for any deviation from the normal size of card due to expansion or contraction caused by humid weather conditions.

Another object of the invention is to devise the card feed unit in a sectional manner which includes a hinged upper part which is rocked to secure access to parts which otherwise would be inaccessible for service and inspection requirements, and also to jammed cards which fail to issue from the supply magazine. A feature of the invention in this connection is to enable the upper section to be rocked without necessitating the disconnection of operating links or the like between the main drive at the lower section and parts to be operated which are carried by the upper section.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1a is a view similar to Fig. 1 but with the hinged upper section and the hinged storage magazine rocked to show the manner of opening the machine for securing access to parts in the lower section.

Fig. 4 is a plan view with the upper hinged section of the unit removed and fragmentary in portions to show more clearly the parts which would be concealed.

Fig. 5 is a view in side elevation showing the gripper frame assembly and associated cam operated linkage for closing and reopening the card grippers.

Fig. 6 is a transverse sectional view taken on the line 6—6 of Fig. 5.

Fig. 7 is a transverse sectional view taken on the line 7—7 of Fig. 5.

Fig. 8 is a detail view showing a portion of a cam operated linkage.

Fig. 13 is a view taken on the line 13—13 of Fig. 14.

Fig. 14 is a transverse sectional view showing the preferred arrangement for aligning the cards at their vertical marginal edges.

Fig. 16 is an electrical wiring diagram.

*Framework*

Figure 1:
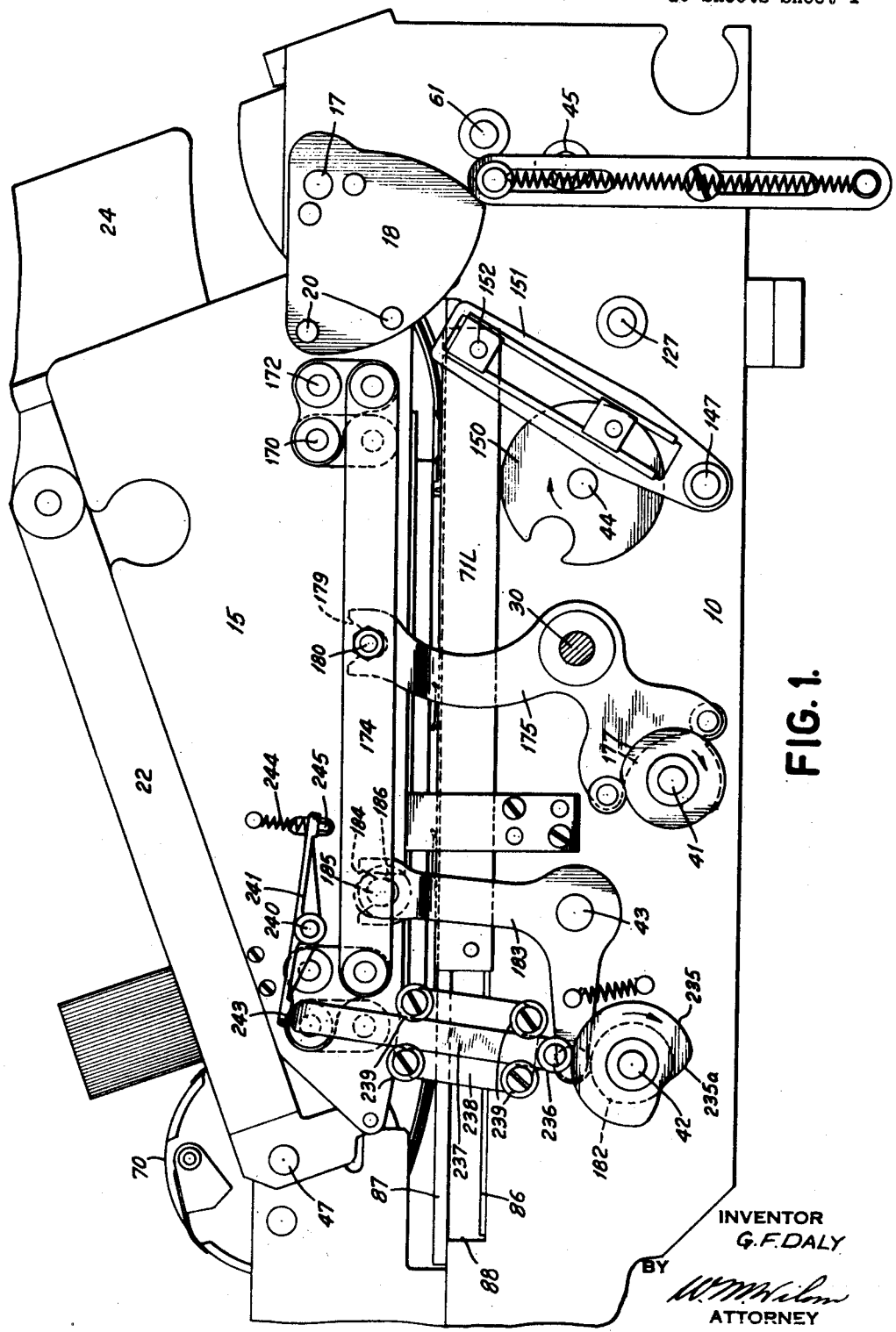
Fig. 1 is a left outside elevational view of the card feeding unit and is taken on the line 1—1 of Fig. 4.

In general, the card feeding unit consists of a lower or bottom section mounted upon a base of the card controlled machine and an upper hinged section which also carries certain parts of the card feeding unit.

The framework for the bottom or lower section of the unit consists of a pair of spaced side frames 10 and 11 (Figs. 1, 2 and 4) which carry, among other parts, the bearings in which operating shafts to be subsequently described are journalled. Rigidity of the lower section of the unit is provided by cross members 12 and 13 (Fig. 3). The transverse operating shafts to be subsequently described also comprise cross members which aid in securing a rigid framework.

The framework of the upper section consists of side frames 14 and 15 (Figs. 2 and 3) and such side frames are suitably spaced by cross members which include a plate 16 (see Fig. 3). The upper framework is hinged to the lower section or portion of the unit on a pair of studs 17 so that said upper section may be rocked about the studs 17 to obtain access to parts in the lower section of the unit and also the upper section, and such arrangement facilitates examination of the operating parts of the unit for the purpose of servicing, adjustment, etc. and removal of a defective card. Preferably this pivotal mounting is provided by having cam plates 18 and 19 (Figs. 1 and 2) attached by rivets 20 to the side frames 15 and 14, respectively, said cam plates thus providing extensions of the side frames 14 and 15 to receive the hinge studs 17.

The card storage magazine 23 comprises a base plate 21 and two side plates 22, each of which is pivoted on a stacker drum shaft 47 and the storage magazine is thus pivoted about the lower section. A catch 23a (Fig. 3) latches the card storage magazine in normal position. The storage magazine receives cards fed by the stacker mechanism after such cards have passed through the machine to control functions in the card controlled machine. To obtain access for the purposes stated, the card storage magazine 23 is first rocked counterclockwise about shaft 47 to the Fig. 1a position, now removing it from the upper section which is now free to be rocked clockwise about studs 17 to the Fig. 1a position. The reverse procedure is followed when the unit is reclosed and the normal downward position of the upper section is insured by having a foot cam portion 22b (Fig. 1a) of each side plate 22 engage a related roller 22c which is carried by the rear end of the related side plate 14 and 15. The pressure and cam action on rollers 22c force the upper section to normal downward position by the act of restoring the storage magazine to the Fig. 1 position.

Suitable side plates 24 (Figs. 1 and 2) together with the cross plate 16 provide a card supply magazine 25 from which magazine cards are fed singly for their presentation to analyzing stations to be subsequently described. Plate 16 is carried by the upper section and is the rear wall of the magazine. The side plates 24 are split as shown in Fig. 3 so that the upper part can be carried by the side plates 14 and 15 and the complementary portions can be carried by the lower section of the unit. This enables the upper portion of the card supply magazine to rock about studs 17 when the upper section is rocked.

All of the gear drives and rotating shafts of the card feed unit are carried by the lower portion of the unit. The power for driving the card feeding unit is derived from a main drive shaft 27 (Fig. 12a) which is a continuously operating drive shaft of the machine. To shaft 27 there is secured a gear 28 meshing with a gear 29 having a 2–1 gear ratio so that for one revolution of shaft 27, shaft 30, to which gear 29 is secured, is rotated clockwise as viewed in Figs. 2 and 12a and counterclockwise as viewed in Fig. 3 one-half revolution per machine cycle.

Shaft 30 has secured to it a gear 31 (Figs. 2 and 4) which drives a train of intermeshing gears 32, 33 and 34 which are mounted outside of the main side frame 11 and by suitable compounding drives gears 35, 36 and 37.

Inside of the side frame 11, referring to Figs. 3 and 4, a gear 38 secured to the main drive shaft 30 drives a train of gears 39 and 40.

Figure 2:
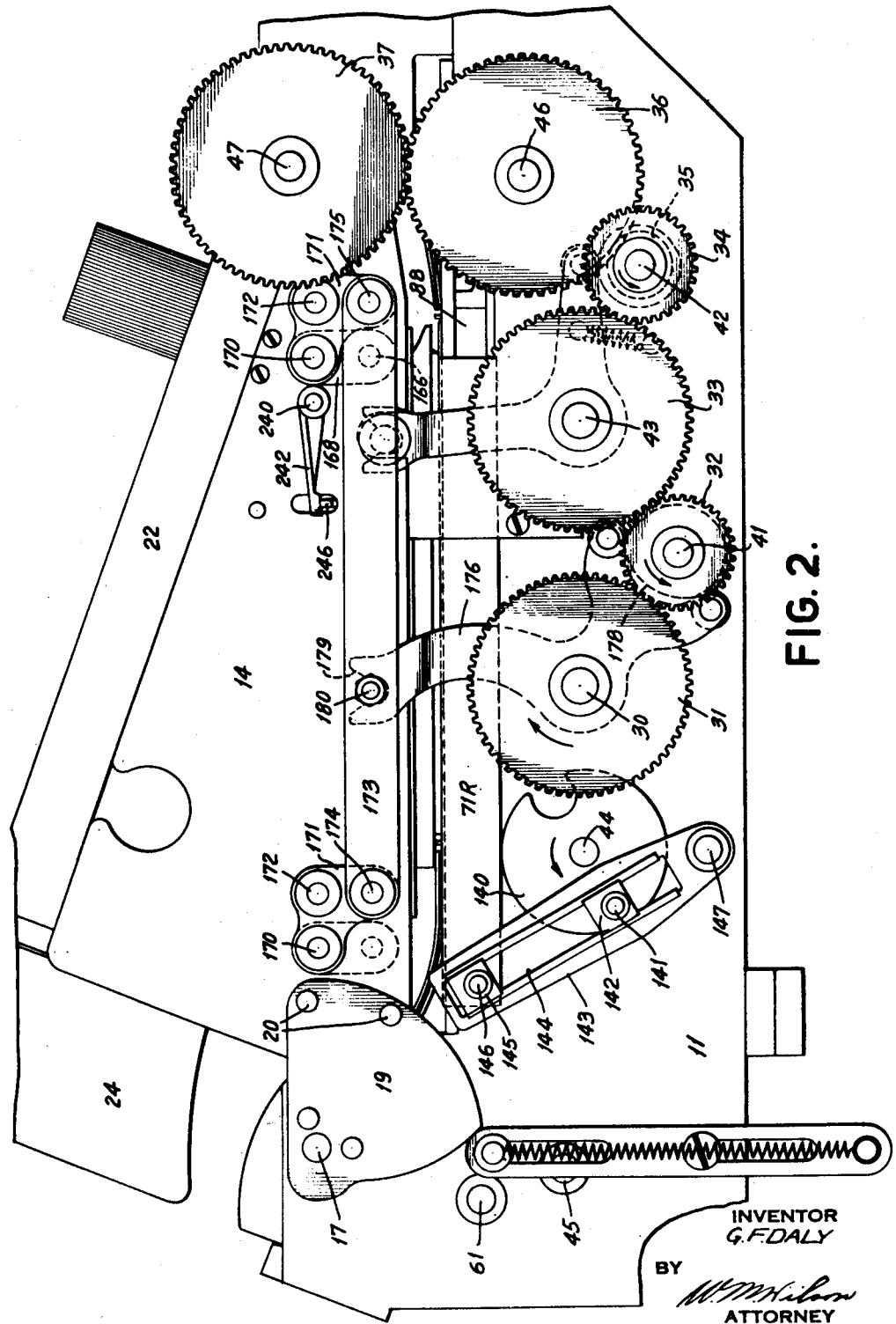
Fig. 2 is a view similar to Fig. 1 but is an outside elevational view of the right side of the unit and is taken on the line 2—2 of Fig. 4.
Figure 3:
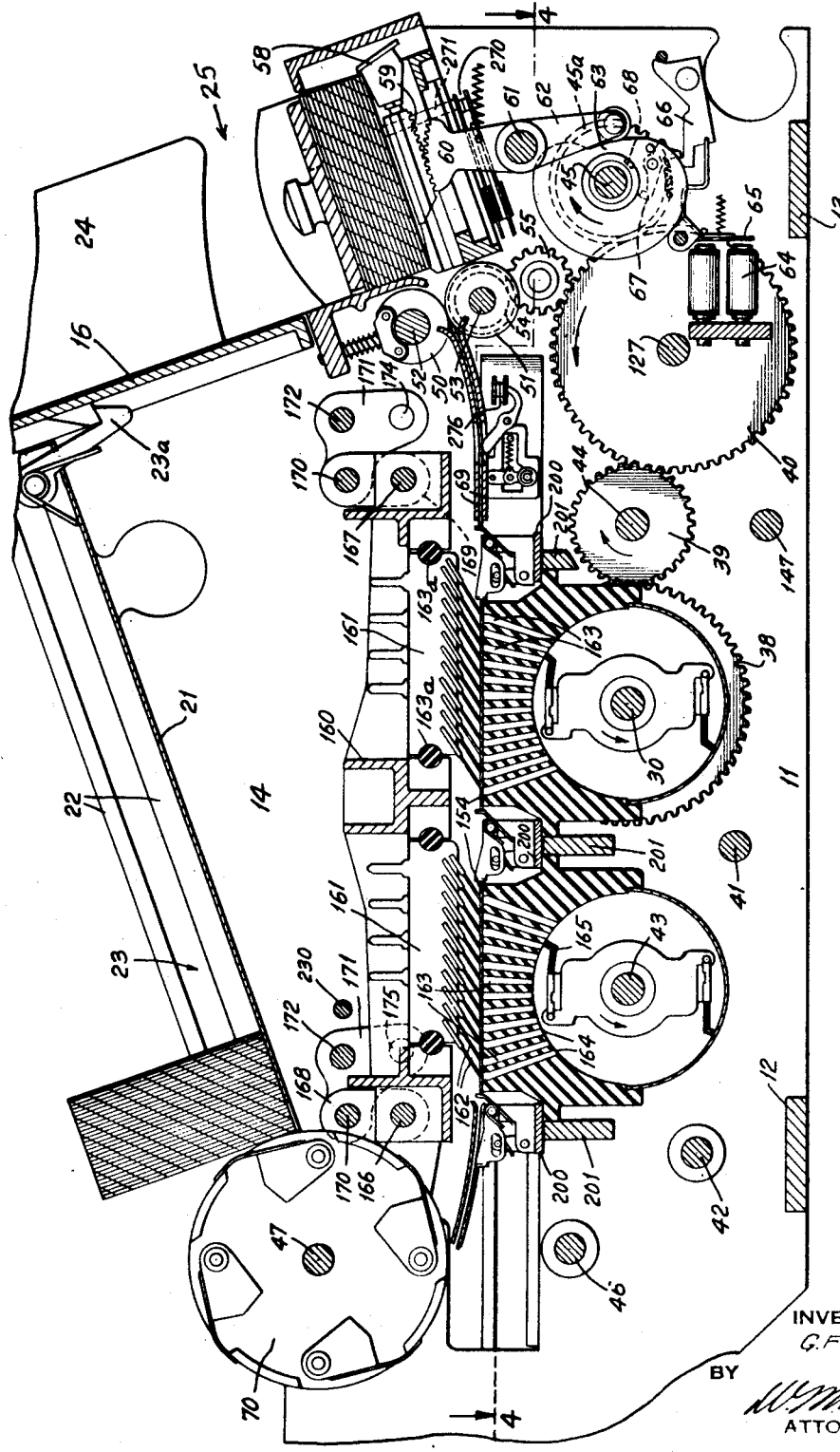
Fig. 3 is a longitudinal sectional view taken on the line 3—3 of Fig. 4.

Gear 32 is secured to a cam shaft 41 (Figs. 2 and 4) and gears 34 and 35 are secured to a cam shaft 42, both cam shafts being driven counterclockwise as viewed in Fig. 2 one revolution per machine cycle. The gear 33 is secured to a commutator drive shaft 43 and likewise the main drive shaft 30 is utilized as a commutator drive shaft.

Gear 39 (Fig. 3) is secured to a crank shaft 44 and gear 45a to a clutch drive shaft 45, both shafts 44 and 45 being driven clockwise (Fig. 3) one revolution per machine cycle. Gear 36 is an idler gear which drives the stacker drum assembly through gear 37 and is loosely supported on a stud 46. Gear 40 is loosely mounted on a rocker shaft 127. The gear 37 is secured to the stacker drum driving shaft 47, it being especially noted that this shaft is journalled in the side frames 10 and 11 of the lower portion of the card feeding unit.

For feeding the cards which emerge from the card supply magazine top edge foremost and printed face down there is provided cooperating feeding rollers 50 and 51 (see Fig. 3) mounted on the respective shafts 52 and 53 carried by the lower portion of the card feeding unit. Lower feeding roller 51 has secured thereto a gear 54 meshing with an idler gear 55 which is driven by the gear 40.

Card feed from supply magazine

A conventional card picker is provided to feed cards singly from the supply magazine and includes a card picker 58 (Fig. 3) having a swivel mounting on a slidably mounted rack 59, all of which parts are carried by the lower portion of the card feeding unit. Said rack 59 is operated by a segment arm 60 secured to a rocker shaft 61 to which latter there is secured a follower arm 62 operated by a cam 63.

To effect selective card feed operations there is provided the usual one-revolution clutch which includes a card feed control magnet 64. As in the well known construction the armature 65 thereof rocks a clutch release arm 66 which enables a pawl 67 pivoted on the cam 63 to engage a notch 68 formed in a disk secured to the one revolution drive shaft 45. When such clutch engagement is effected shaft 45 will drive the cam 63 a complete revolution at which time the clutch release arm 66 will be in a position to disengage the pawl 67 from notch 68.

By electrical circuits to be subsequently described an impulse is transmitted to the clutch control magnet 64 at about 250° of the cycle (see Fig. 15) so that the card feed from the supply magazine is initiated at the 285° of the cycle to feed the lowermost card to the now rotating feeding rollers 50, 51. From Fig. 15 it will be noted that such rollers feed the card from the beginning of the cycle up to 200° of the machine cycle to feed the card to the first sensing station, known herein as a "presensing station." As the card emerges from the feeding rollers 50, 51, it is guided by spaced plates 69 (Fig. 3) which are carried by the lower portion of the card feeding unit and are located at the so-called presensing station P (Fig. 4).

Stacker drum

After the card has been twice analyzed and it emerges from the second analyzing station it is engaged and received by a stacker drum 70 (Fig. 3) of a conventional construction and since its construction and operation is well known it will only be generally stated that such stacker drum receives a card, turns it over and deposits it in the card storage magazine 23 and in the same order as the cards are originally stacked in the supply magazine 25.

Card gripper feeding devices

It is preferable to positively grip the cards to feed them from station to station without resorting to the expedient of card feeding rollers, because when such cards are released by the grippers they are free to be repositioned by the aligning devices, if disaligned. As will appear later, the presence of a card in the presensing station enables the release of the grippers to seize each card and reciprocation of the gripper frames to feed the card from the station in which it is located to the successive station. These stations are indicated in Fig. 4 as the "Presensing station," the second or "Control station" which is used for control purposes in the customary card controlled accounting machine and the third station designated as "Adding-printing control station" having the functions of this legend.

In general there is provided at the right side of the card feeding unit at the lower portion thereof a reciprocable gripper frame 71R (Fig. 4) carrying card grippers 72, 73 and 74. At the other side of the machine the companionate reciprocable gripper frame 71L carries grippers 75, 76 and 77. Obviously, from Fig. 4 grippers 72 and 75 feed the card from the Presensing station to the Control station and simultaneously grippers 73 and 76 move a card from the latter designated station to the Adding-printing control station and grippers 74 and 77 feed a card from the Adding-printing control station to the stacker drum assembly 70. When three cards are at their respective stations the concomitant movement of gripper frames 71R and 71L will feed three cards during the same machine cycle.

In view of the similarity in construction of both reciprocating gripper frames 71R and 71L the detailed description of the gripper frame assembly will be confined to construction and operation of gripper frame 71R only. The gripper assembly is carried by an inverted U-shaped frame comprising a cross plate 80 (Figs. 6 and 7) and integral dependently hung side plates 81 and 82, plate 81 being outside of the side frame 11 and side plate 82 at the inside of the side frame 11. The side plate 81 carries two stud shafts 83 (see Fig. 5) which provide the bearings for respective ball bearing mounted wheels 84 and 85, which wheels roll over a lower track 86 and underneath an upper guide track 87 during the reciprocation of the gripper frame. The upper edge of the side frame 11 has a rectangular longitudinal open notch 88 (Fig 1) and on the bottom of this notch the track 86 is fastened, and extending over this notch the track 87 is attached. Rotatable on the stud shafts 83 and at each side of the wheels 84 or 85 are washers 90 (Fig. 7) enlarged with respect to the diameter of the wheels and they are so confined on the guide shafts 83 as to bear against the sides of the tracks 86 and 87 to preserve the sidewise alignment of the gripper frames during their reciprocation.

Reference numerals 72, 73 and 74 refer to the stationary plates of the grippers since they are affixed by rivets 91 to the top of the cross plate 80 and as shown in Fig. 4 extend laterally inwardly over the side marginal edges of the cards. The companion movable gripper plate 93 extends inwardly similar to the stationary gripper plate and is slidably mounted so that when free to move upwardly it will positively grip the marginal edge of the card which is between it and the companion fixed gripper plate. Movable gripper plate 93 is guided in its vertical movement by a pin 94 secured thereto, cooperating with a hole in the related fixed gripper plate. At the lower part said gripper plate has a square notch 95 cooperating with the rounded end of a toggle lever 97 which is pivoted on a guide stud or pin 96 carried by the side plate 82. In this manner the movable gripper plate is guided in its vertical movement.

To bring the movable gripper plate 93 into gripping relationship with the related fixed gripper plate, any suitable means may be provided but is preferably performed by a toggle lever system which acts quickly to enable the grippers to seize the card edge. This system comprises the lower toggle lever 97 pivoted on said stud 96 and an upper toggle lever 98 pivoted on a pin 99 carried by the movable gripper plate 93. The connecting pin 99 at the midpoint of the toggle lever connects said toggle levers and passes through a notch in the side plate 82 and is received by a hole 110 (Fig. 6) in a toggle control link 100. The toggle link 100 is mounted inside of the side plate 82 and is guided for reciprocating movement by studs 101 (Fig. 5) carried by the side plate 82 cooperating with guide slots 102 formed in the toggle control link 100. The toggle control link is normally latched by a latch lever 103 pivoted on a stud 104 carried by side plate 82, said latch being urged by a spring 105 extended from said latch lever to a stud 112 carried by toggle control link 100 to engage a notch 106 in the toggle control link 100. Thus, during the time that the three grippers are to be opened so as to be free of the marginal edges of the card the toggle control link 100 is normally latched by the latch lever 103. At the instant when the cards are to be engaged by the respective grippers, by means to be presently described, latch lever 103 will be rocked to disengage it from the shouldered notch 106, and in so doing tensions spring 105. This will release the toggle control link 100 and said link will be instantly moved towards the right as viewed in Fig. 5, partly by the tension of spring 105 so that by shifting each pin 99 to the right the respective toggle lever system will be straightened, elevating the lower movable gripper plate 93 and closing the gripper jaws upon the marginal edge of the card. The movement of the toggle control link 100 to the right is effected by the action of spring 105, as just stated, and three springs 107, 108 and 109, each of which is connected to the midpoint connecting pin 99 and to a respective stud 111 carried by the side plate 82. It is preferable to enable each movable gripper plate to move independently of the toggle control link 100, especially at the time that the toggle lever system is straight so that under the action of the respective spring 107, 108 and 109 the movable plate will be moved upwardly freely. This is effected by enabling toggle control link 100 to move slightly farther than connecting pin 99 of any of the individual toggle links so that the toggle lever system is under control of its respective spring 107, 108, 109. This preferred action can be effected by having each of the pins 99 operate in a hole 110 (Fig. 6) in the toggle control link 100 which is slightly larger than the diameter of the connecting pin 99.

The closure and reopening of the three grippers carried by the reciprocating gripper frame 71R is effected under control of a swinging plate 115 (Figs. 5, 6 and 7). The swinging plate 115 is carried at one end by a bell crank lever 116 pivoted on a fixed rod 114 carried by the side frame 11 and also to a stud 118 carried by said plate 115. A similar bell crank 117 is pivoted on a fixed rod 119 carried by the said frame 11 and also to a pivot stud 118a carried by the plate 115. The lower arm of each of the bell cranks 116 and 117 projects into a respective slot 120 in a gripper operating link 121. The gripper operating link 121 is slidably mounted on the side frame 11 by having its notches 122 cooperate with guide studs 123 carried by said side frame. One end of the gripper operating link carries a stud 124 fitting in a bifurcation 125 of an arm 126 secured to a rock shaft 127, which latter as shown in Fig. 4 is journalled in the side frames 10 and 11. To the rock shaft 127 there is secured a follower arm 129 cooperating with a cam 130 and a supplemental follower arm 131 cooperating with a cam 132. A cam 130 is selectively connected by a clutch to the drive shaft 45 as will be presently described whereas cam 132 is permanently fixed to drive shaft 45, as shown in Fig. 4.

Assuming, as previously stated, that the grippers are to be closed and the gripper frame is to be moved to the left in a card carrying stroke from the Fig. 5 position, at this time the high portion of cam 130 will rock arm 129 and shaft 127 counterclockwise and through the pin and notch connection 124—125 the gripper operating link 121 is moved to the left as viewed in Fig. 5; rocking both bell cranks 116 and 117 clockwise to elevate plate 115, thus causing the operating portion 133 thereof to engage the lower lever 134 of latch 103, thus rocking the latch and releasing the toggle control link 100 and in the manner previously described enable the three grippers to concurrently close upon the card. After said grippers have been released to card gripping position the reciprocating gripper frame is then moved to the left in a card feeding stroke from the Fig. 5 position by means to be presently described.

After the grippers have carried the cards to the successive analyzing station the grippers, of course, should be reopened prior to their return movement, or to the right as viewed in Fig. 5, free of said cards and this function is effected by again elevating swinging plate 115 when the reciprocating frame is in such position that another operating portion 138 of swinging plate 115 is coordinated with the lower arm of a bell crank 135 (see Fig. 5). The second elevation of plate 115 when the above correlation is obtained is performed by the cam 132 which, at the desired time in the operating cycle, rocks the respective follower arm 131 and shaft 127 so as to again shift the gripper operating link 121 to the left (Fig. 5). This, as previously described, will elevate plate 115 so that another operating portion 138 rocks bell crank lever 135 which is pivoted on a stud 136 carried by the side frame 11. The upper arm of the bell crank has an open notch engaging a pin 137 carried by the toggle control link 100. Rocking of the bell crank lever 135 in a counterclockwise direction will shift link 100 to the left so as to be relatched by latch lever 103 and at the same time rocking all of the toggle levers from their straight line position to the position shown in Fig. 5 to reopen the grippers.

Reference has been made to the reciprocation of the gripper carrying frame 71L and such reciprocation is effected by means of a crank disk 140 (Fig. 2) rotatable counterclockwise by the constantly rotating shaft 44 to which said crank disk is secured. Crank disk 140 carries a pin 141 which supports a rectangular driving shoe 142 which is guided in a crank arm 143 so as to ride in a slot 144 therein. Also slidable in slot 144 is a similar shoe 145 supported by a pin 146 carried by the gripper frame 71L. Arm 143 is fixed to a rock shaft 147.

Figure 15:
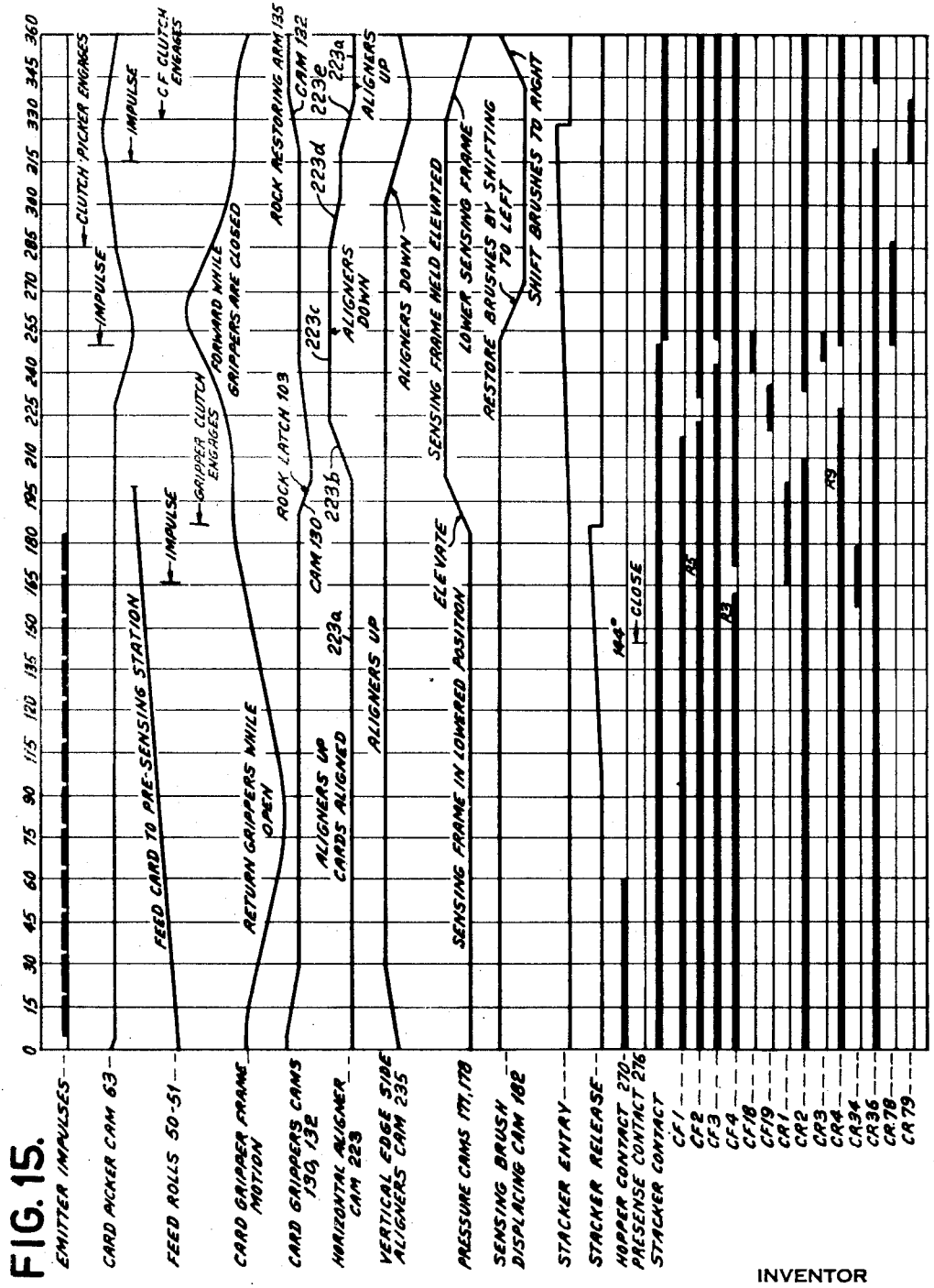
Fig. 15 is a combined electrical and mechanical timing diagram of the machine.

Fig. 2 shows the parts just described in the position they occupy at the start of a card transporting operation, that is, at 210° of the timing diagram (Fig. 15). Just prior to this, assuming that a card has been received in the presensing station, a clutch connection will be made as previously described to rotate cam 130 (Fig. 8) to cause the rocking of the latch lever 103 (Fig. 5) to close the grippers. With all the grippers closed, rotation of crank disk 140 through 120° will rock arm 143 sixty degrees, moving gripper frame 71L from the left to the right with a harmonic motion to effect a quick feeding stroke and thereafter a slow return of the gripper frame while said grippers are opened. At the termination of the quick feeding stroke, at about 323°, arm 135 (Fig. 5) is rocked to cause the opening of the grippers, the slow return of the gripper frame then moving the opened grippers from the right as viewed in Fig. 2 to the left with a slow return.

While the detailed construction of the means for effecting the reciprocation of the gripper frame 71L has been described, it is to be understood that referring to Fig. 1 a similar means is provided to reciprocate the other gripper frame 71R concomitantly and comprises a crank disk 150 which operates in a similar manner a crank arm 151 which has a slidable shoe connection 152 to the reciprocating gripper frame 71R.

Obviously, if three cards have been previously fed to the three different stations, movement of the gripper frames 71L and 71R to the left as viewed in Fig. 4 will enable the closed grippers carried thereby to transport the card to the next station or from the Adding-printing control station to the stacker drum assembly. It is explained that when a card has been fed to the Presensing (Fig. 3) Station P, it is completely free of the feeding rollers 50 and 51 so that seizure by the grippers 72 and 75 will convey the card to the Control station. Furthermore, as shown in the timing diagram, during the time that the grippers are returned while open, the feeding rollers 50 and 51 are now feeding a card to the Presensing station since it is now empty (see Fig. 15—timing of feed rolls 50—51).

During the operation of the machine the gripper frames constantly reciprocate once for each machine cycle, since drive shaft 44 is constantly rotating. Since cam 132 (Fig. 4) is also secured to the constantly rotating shaft 45, bell crank 135 (Fig. 5) is rocked once for each machine cycle whether or not the grippers have previously been closed. The closure of the grippers, however, is an independent selective operation, and is dependent, as will be subsequently explained upon the presence of a card to the Presensing station P. By an electrical impulse circuit to be subsequently described, a clutch control magnet 153 is energized (see Fig. 4). This magnet is similar to clutch control magnet 64 and causes the clutch engagement of a similar type of clutch so as to effect a driving engagement between cam 130 and the drive shaft 45. This clutch connection will then enable elevation of swinging arm 115 to cause the closure of the grippers in the manner previously described.

Card analyzing mechanism

The card feeding mechanism forming part of the present invention is especially useful in card controlled machines wherein cards are analyzed at rest. While the specific form of the card analyzing mechanism now to be described forms no part of the presently claimed invention it will, nevertheless, be explained in some detail so as to more clearly understand the usefulness of the present card feeding mechanism. The analyzing mechanism has been devised for analysis of the type of perforated card shown in the patent to C. D. Lake, No. 1,772,492, granted August 12, 1930. In general, the card 154 (Fig. 4) has perforations (not shown) which are arranged in vertical columns and in horizontal rows, through which perforations electrical circuits are made to control functions of the machine. The general outline of such cards 154 is shown in Fig. 4.

A frame 160 (Fig. 3) carries for each analyzing station a plurality of metal current carrying members 161, one for each card column and each carrying a plurality of angularly positioned metal analyzing brushes 162 which encounter the perforations and pass through to complete the electrical circuit. Plates 161 are insulated from each other and are attached to the frame 160 by insulating rods 163a. By an electrical connection to each plate 161 current is supplied to the electrical analyzing brushes 162. For each card column a set of brushes 162 makes selective contact through the perforations in the column to extensions 163 of emitter contact points 164. A brush readout 165 driven by the shaft 43 or 30 makes successive contact with the contact points 164 to transmit impulses at differential times, dependent upon the location of the perforation.

The above described arrangement of analyzing brushes and readout commutator is duplicated for each card column and the assembled arrangement is duplicated for the Adding-printing control station and the Control station, the commutator readouts being driven by the shafts 30 and 43.

The analyzing brush carrying frame 160 is carried by the upper portion of the card feeding unit and is mounted between the side plates 14 and 15 in the following manner: At the ends of the frame 160 (Figs. 2, 3) studs 166 and 167 carried thereby are the pivotal connections of links 168 and 169 which are also connected by studs 170 to a related bell crank 171 which is pivoted upon a rod 172 carried by the side frames 14 and 15. A link 173 (Fig. 2) is connected by studs 174 and 175 to the bell cranks 171 at the same side of the frame 160. Link 173 is the controlling member of a parallelogram linkage by means of which the analyzing frame 160 is dependently hung so that by movement of said link 173 the analyzing frame 160 may be elevated and lowered in a straight line vertical movement, insuring the passage of the analyzing brushes through the correlated perforations. While the specific description has been confined to the supporting structure for one side of the analyzing support frame, shown in Figs. 2 and 3, the same type of support is provided for the other side of said frame as is shown in Fig. 1, wherein controlling link 174 designates the controlling member for the parallelogram linkage for the other side of said frame. Shifting of the links 173, 174 in one direction or the other to elevate or depress the analyzing frame is effected by follower arms 175 and 176 (Figs. 1 and 2) which are operated by respective complementary cams 177 and 178 secured to the drive shaft 41. The connection between the follower arm 176, 175 and the respective controlling member link 173 or 174 consists of an open notch 179 on the follower arm receiving a stud 180 carried by the related link 173 or 174. This open notch and stud connection makes it unnecessary to remove pins or studs to effect a disconnection in the operating train when elevating the upper section of the card feeding unit (see Fig. 1a).

In Fig. 3 the analyzing frame is shown in depressed position with the readout commutators in the rotated position they occupy shortly after the emitter impulses are initiated.

During the time that the emitter impulses are being transmitted the card gripper frames with opened grippers are returned with a slow return stroke (see Fig. 15), thus enabling the cards to be held in analyzing position. After the analysis of all index point positions by the sensing or readout commutators which occurs at about 183° and prior to the movement of the gripper frames to feed the cards to the next station the complementary cams 177 and 178 are effective to rock the controlling link 174 to the left (Fig. 1) and the link 173 to the right (Fig. 2), rocking the bell cranks 171 to elevate links 168 and 169 to raise the analyzing frame 160, positioning all the analyzing brushes out of contact with the cards in the analyzing stations.

Near the end of the machine cycle, or at about 330° (see Fig. 15), cams 177 and 178 are then effective to reverse the movements of links 173 and 174 which results in the depression of the analyzing frame and maintenance of the frame in lowered position during the time of emission of the impulses by the readout commutators.

While the movement of the frame downwardly exerts pressure on the flexible brushes 162 to cause them to project through the perforations and make firm electrical contact, it is desirable to effect a slight lateral movement of the frame 160 so as to wipe the brushes over the card and if in contact with a commutator contact point 164 to wipe the brush thereover to make an efficient electrical contact. This is preferably effected as shown in Fig. 3 by displacement of the frame 160 slightly to the right when the brushes are in contact with the card to be analyzed. To effectuate this there is secured to drive shaft 42 a cam 182 which operates a bell crank follower arm 183 loosely pivoted on the shaft 43. The upper arm of said bell crank has an open notch 184 which receives a stud 185 carried by the frame 160 and which projects through a notch 186 in the side frame 15. Notch 186 is a clearance notch. The open notch 184 in the follower arm facilitates the connection and disconnection of the operating train now being described whenever the upper section of the unit is raised or lowered.

Assuming that the analyzing frame 160 is in lowered position, cam 182 will be effective at about 251° of the machine cycle (see Fig. 15) to shift frame 160 slightly to the left (Fig. 3), thus restoring frame 160 from its previously displaced position to the right. Near the end of the machine cycle or at about 330° the sensing frame is in lowered position and at about the time the analyzing brushes come in contact with the card cam 182 will rock the follower arm 183 to displace the frame 160 to the right, thus wiping the analyzing brushes, either over the surface of the card or the contact points 164 where perforations are encountered.

*Card stops and the aligners for horizontal edges of cards*

The card stops and aligners now to be described are employed to align the card along the horizontal edges to accurately correlate the horizontal rows of index points of the card with the related rows of analyzing brushes. The horizontal edges of the cards define the longer edges of the cards, because as a card is ordinarily held up for view by an operator the longer edges are horizontal and the shorter (left and right marginal edges) are the vertical edges. All of the horizontal edge aligners and card stops are carried by the lower portion of the card feed unit and are visible, as shown in Fig. 4 when the upper section has been elevated or removed.

Figure 9:
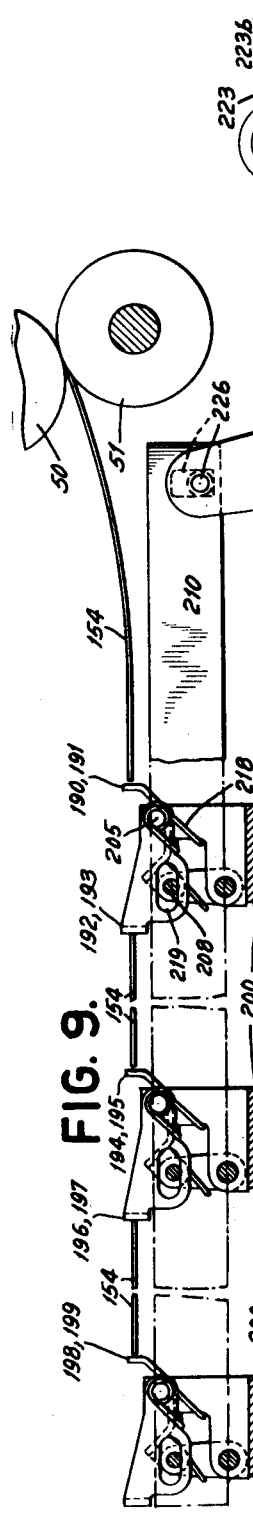
Fig. 9 is a view in side elevation showing the correlation of the card aligners and card stops and associated cam operated linkage.

In general, at the presensing station P the card is aligned between the bight of the feed rollers 50 and 51 and two aligners 190, 191 (see Fig. 9). The card at the control station is aligned between card stops 192, 193 (Figs. 4 and 9) and aligners 194 and 195 and the card at the Adding-printing control station is aligned between card stops 196 and 197 and aligners 198 and 199. The specific construction of such card aligners and card stops will be given in connection with one pair in view of the duplicate construction.

Figure 12A:
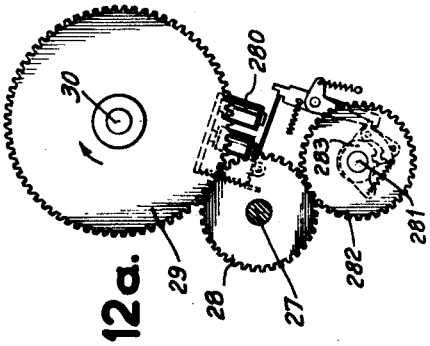
Fig. 12a is a detail right hand view of the main drive and an associated clutch.
Figure 12:
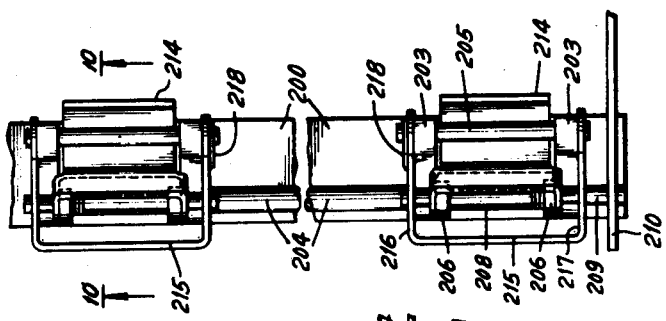
Fig. 12 is a plan view showing a pair of concurrently operated card stops and aligners.
Figures 10, 11:
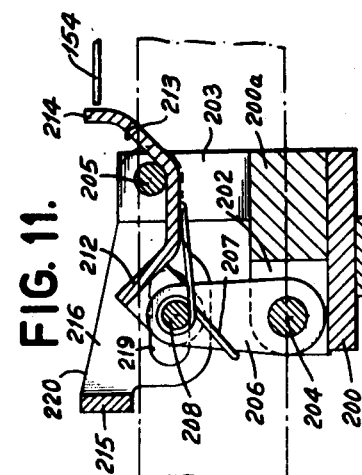
Fig. 10 is a transverse sectional view taken on the line 10—10 of Fig. 12.
Fig. 11 is a sectional view similar to Fig. 10 but shows the parts in a further operated position.

Referring to Fig. 3 extending transversely across the machine are supporting bars 201, each of which is employed to carry the aligner and card stop assembly as well as the readout commutators previously described. Fixed to each bar 201 is a bar 200 (Fig. 10) supporting a pair of blocks 200a, each provided with horizontally extending ears 202 and upstanding vertical ears 203, the ears 202 forming the bearing for transverse rock shaft 204, whereas the upstanding ears 203 carry a support rod 205. Fixed to the rod 204 for each aligner is a pair of upstanding arms 206 carrying a bail rod 208. As best shown in Fig. 12 the rod 208 has an extension 209 received by a hole in an aligner operating link 210. Pivoted on the rod 208 is a bail 211 so constructed that the cross plate thereof has an extension 212 of which portion 213 is of a cam formation and the terminal end 214 functions as a card aligner. One end of a torsion spring 207 wound around the rod 208 is hooked around one arm 206 and its free end bears beneath the bail extension 212 to cause the cam portion 213 to bear against the fixed rod 205. As the card gripper frame approaches the termination of its card feeding stroke the leading horizontal edge of the card will approach the card aligner portion 214, which at this time is in the depressed position as shown in Fig. 10 out of the plane of the card. Thereafter, link 210 is moved slightly to the right, thus rocking the supporting arms 206 slightly clockwise from the position shown in Fig. 10 to the position shown in Fig. 11. This motion causes the pin 208 on which the card aligner 214 is pivoted to move slightly to the right, shifting the aligner portion 214 from the position shown in Fig. 10 to the position shown in Fig. 11 and the cooperation of the fixed stud 205 with the cam edge 213 will cause the card aligner portion 214 to move upwardly above the plane of the card and slightly to the right; and in the extreme rocked position of the card aligner portion 214 will engage the horizontal leading edge of the card so as to present a square aligning surface to the edge to correct any deviation from the proper horizontal position in the sensing station. It is preferable to overfeed the card by the grippers and since, at this time, the card is free of the grippers the aligners shift the floating card backwardly to correct any disalignment and intentional overfeed.

Associated with the card aligner just described is a card stop which cooperates with the trailing horizontal edge of the card. Such card stop comprises a bail plate 215 and side plates 216 and 217 pivoted on the rod 205. Wound around the rod 205 is a torsion spring 218 which functions to rock said stop bail 215 upwardly so that the lower edge of a clearance slot 219 in each of the side plates 216 and 217 bears against the rod 208, the torsion spring 218 obviously holding the card stop bail 215 in upward position.

As the card is being fed by the grippers the leading edge will ride up inclined edges 220 of the side plates 216 and 217 and over the stop bail 215, slightly rocking the latter downwardly against the action of torsion spring 218 until the trailing edge of the card cooperates with the card stop bail 215 which presents a square aligning surface thereto. It will be noted that a pair of card stop bails 215 align the same trailing edge of a card but function independently of each other, whereas shaft 204 connects the two pairs of arms 206 for a pair of card aligners to cause them to function together with respect to the leading horizontal edge of the card.

Reference has been made to the motion of the aligner operating link 210 to project the card aligners 214 to a functional position and the means utilized to carry out this operation will now be described.

Movement of link 210 to concurrently operate the three pairs of aligners is effected by a cam 223 (see Figs. 4 and 9) which has a sleeve connection 224 to the cam 130 which, it will be recalled, is rotated each time that the clutch control magnet 153 is energized to clutch driving shaft 45 to said cam. Cam 223 operates on a roller of a follower arm 225, which arm is loosely pivoted on rock shaft 127, said follower arm having a pin and slot connection 226 to the link 210.

During the time that the follower roller cooperates with the highest cam portion 223c of cam 223 (see Fig. 15), link 210 is at the extreme left hand position and the aligners 214 are down as shown in Fig. 10 to enable the feeding of the card by the closed grippers and avoid interference with the cards.

In Fig. 9 the follower roller is shown in the position where it is to cooperate with cam portion 223d, enabling a spring 227 to rock the follower arm 225 to shift link 210 slightly to the right to move the aligners 214 in the position shown in Fig. 11, without, however, abutting at this time the leading edges of the card. As the follower roller cooperates with the inclined portion 223e, the aligners 214 will move a little further to the right, as viewed in Figs. 9 and 11, so as to now abut the horizontal leading edge of the cards to effectively align them. During the time that the follower roller cooperates with the circular lowest cam portion 223a, link 210 will be in its extreme right hand position, to maintain the aligners and stops in their uppermost positions and from Fig. 15 it will be observed that this occurs during the time that the cards are being analyzed.

During the time in the machine cycle that the follower roller cooperates with cam portion 223b link 210 is moved to the extreme left hand position to shift the aligners in lowered position. At this time the card feeding operation is initiated by the closed grippers.

*Vertical card edge aligners*

These are disposed at the Control station and the Adding-printing control station and are preferably disposed only at these stations since any possible irregularity or deviation of the card from its proper line or direction of feed as it is fed to the Presensing station P is not of any consequence. If it occurs it is corrected at each of the analyzing stations to accurately correlate the vertical columns of index point positions with the correlated columns of analyzing brushes.

The preferred construction of this aligning arrangement is shown in Figs. 1, 2, 4, 13 and 14. With the exception of cam operated parts shown in Figs. 1 and 4 the vertical aligner arrangement is carried by the upper section of the card feeding unit. Secured to the constantly rotating shaft 42 is a cam 235 (Figs. 1 and 4) cooperating with a follower roller 236 at the lower end of a floating follower link 237. To guide the latter in its reciprocating movements there is affixed to the side plate 10 (Fig. 1) a bracket plate 238 which carries four channeled guide rollers 239 in which follower link 237 is disposed for a sliding movement.

Secured to a transverse rock shaft 240 journalled in the frames 14 and 15 of the upper section of the card feed unit is an arm 241 (Fig. 1) and an arm 242 (Fig. 2), arm 241 having an extension 243 engageable with the upper end of the follower link 237. Roller 236 cooperates with a scalloped portion 235a of cam 235 after 300° of the machine cycle to thereby enable the vertical card edge aligners to be moved downwardly to align the left and right vertical edges of the card at each analyzing station if the card has been displaced from its proper line of feed. Movement of the vertical aligners to be subsequently described occurs after the cards have been fed to analyzing position and the grippers have been opened to release the card. The release from the grippers enables the aligners to function to align the vertical edges of the floating card. When scalloped cam portion 235a cooperates with follower roller 236 a spring 244 (Fig. 1) connected to arm 241 will rock shaft 240 counterclockwise and arms 241, 242 upwardly away from the ends of cooperating arms 245, 246. Arms 241 and 242 are shown in Fig. 14 in such upwardly rocked position which has enabled the respective springs 247 and 248 to rock both arms 245, 246 upwardly and rock a related shaft 249 and 250. Shaft 249 is the rocker shaft for operating the aligners 252 at the left vertical edge of the card or column 80 thereof, whereas rocker shaft 250 rocks the aligners 253 disposed at the right vertical marginal edge of the card which is adjacent column No. 1. For aligning the left and right marginal edges of the same card there is provided vertical aligners 252, 253 (Fig. 14) which are at the same analyzing station.

Each aligner 252, 253 consists of a bail shaped plate dependently hung on a rod 254 carried by arms 255 and 256 secured to rock shaft 249 or 250. Rock shaft 249, 250 is journalled in a bracket plate 257 carried by a frame plate 14 or 15 of the upper card feed section. A bracket 259 affixed to frame plate 15 carries a pin 260 cooperating with a cam slot 261. A torsion spring 262 is wound around the support pin 254 and one end of said spring is hooked around arm 255 and the other end bears against the inward portion of the cross plate of the aligner 252, 253. This spring is so arranged as to urge each aligner 252, 253 against the edge of the card. Furthermore, the anchorage of this spring is such that aligner 252, 253 tends to pivot about pin 254 so that it is moved inwardly as cam slot 261 cooperates with guide pin 254.

To limit the extent that shafts 249 or 254 may function to actuate card aligners 252 and 253, the adjustable stop screws 263 and 264 are provided. Screws 263 and 264 are threaded into projections which extend down from the brackets 259. Each of the card aligners 252, 253 is slotted at its lower end as shown in Fig. 13 to provide space for the plain head of the screw 263 and to provide an adjustable stop as shown. The aligning position of the left hand screw 263 is adjusted as shown in Fig. 14 to bring the left margin or #80 column edge of the card in alignment with the analyzing brush of the commutating points of the readout commutator. The spring 262, which actuates the left hand aligner 252, is a relatively heavy spring which will always bring the left aligners against the inner edge of the aligner screw 263.

The right hand aligner screw 264 is adjusted to a position $\frac{1}{32}$" beyond the true position of the right hand edge for a card which is cut to exact size. This aligner is provided with a lighter spring 262 which will not overcome the tension of spring 262 in the left hand aligner. Thus, whether the card be abnormally long or abnormally short, its left hand edge will be positively aligned by aligner 252 and the position of aligner 253 will compensate for such difference in length providing the length of the card is within $\frac{1}{32}$" of the correct dimension. If short, the aligning device will correctly position cards which are abnormally long, even though the additional length exceeds $\frac{1}{32}$".

It is customary in perforating machines used to prepare cards to align against the column 80 vertical edge of the card, and the aligners shown in Figs. 13 and 14 have been designed to utilize this same aligning edge.

It should be noted that the pair of aligners will function to align a card endwise toward either the left or the right as the lower ends of both aligners move downwardly and inwardly during the aligning operation. In the final position of the aligners, aligner 252 will always stop against the head of screw 263 whereas the aligner 253 will only stop against the head of its adjustable screw 264 when the card being aligned is more than $\frac{1}{32}$" short of the nominal dimension.

*Operation of machine in connection with circuit diagram*

The initiation of card feed and the sequential card feeding operations will, it is believed, be best understood by describing the operation of the machine in connection with the circuit diagram (Fig. 16).

A prerequisite to initiation of card feed is that hopper contacts 270 (Figs. 3 and 16) be closed and referring to Fig. 3 this is effected by the depression of a button 271 by cards in the supply magazine 25. When all the cards have been fed out of the magazine the contacts will open and the machine will automatically stop.

When the main supply switch S is closed a current supply is provided to lines 272 and 273. With hopper contacts 270 closed, an obvious circuit to R1 and R2 relays is closed to energize them and a stick circuit for both relays is provided by R1a relay contacts and cam contacts CR36. As is customary in machines of this type, certain contacts are closed by cams attached to a constantly running shaft, such cam contacts herein designated by the prefix CR, and may be driven by the main drive shaft 27 (Fig. 12a). The timing is shown in Fig. 15.

Initiation of card feed is effected by depression of Start key which closes contacts 274 to close a circuit from the line 272, through stop key contacts 277, start key contacts 274, to the start R9 relay to line 273. It should be noted that in the circuit diagram all relays and magnets are connected to line 273 to complete the energizing circuit. R9 relay closes its stick contacts R9a and a stick circuit is provided back to line 272 through cam contacts CR4 to hold R9 relay energized over and through part of the second machine cycle. Obviously, when CR4 contacts open during the second machine cycle and if the Start key is not retained depressed, R9 relay will deenergize and for this reason the Start key is maintained depressed or redepressed until a card issues from the magazine to complete an alternate holding circuit for the R9 relay, when stick cam contacts CR4 open, through R3b contacts and R5b contacts in the manner to be subsequently described. However, with R9 relay energized R9b contacts close and a circuit will be completed when CR3 cam contacts close from line 272 through CR3 cam contacts, R9b relay contacts now closed, to the pickup winding of the R10 relay. The latter closes the R10a stick contacts to complete a stick circuit for the holding winding of the R10 relay back to line 272 through R10a relay contacts and cam contacts CR2. From Fig. 15 it will be seen that the CR2 cam contacts hold R10H relay energized for the completion of the cycle and during the second machine cycle up to 210°. Shortly after the closure of relay contacts R10b cam contacts CR78 close to complete a circuit from the line 272, through R10b relay contacts, cam contacts CR78 and pickup coil of R11 relay and the picker clutch feed control magnet 64, energizing both of them. R11a contacts close to provide a stick circuit for the holding winding of R11 relay and the circuit is held through R10b relay contacts up to 210° of the second machine cycle. Energization of picker clutch feed magnet 64 at about 250° when CR78 cam contacts close will cause the engagement of the picker clutch at about 285° of the first machine cycle (see Fig. 15)

and the lowermost card is then advanced from the supply magazine 25 to the constantly rotating feeding rollers 50 and 51 (see Fig. 3) and the card is fed by the latter to the Presensing station P; and when this condition is obtained a card lever 275 is rocked to close the Presensing station card lever contacts 276 at 144° of the second machine cycle or the first card feed cycle and are kept closed due to the continued presence of a card in the Presensing station.

At 315° of the first machine cycle cam contacts CR19 close to energize a circuit to the CF cam clutch magnet 280 which extends from the line 272 to relay contacts R10b now closed, relay contacts R4d now closed, cam contacts CR19, CF cam clutch magnet 280 (see also Fig. 12a) to line 273. Energization of this magnet at 315° of the cycle will cause at 330° of the cycle the engagement of a conventional one-revolution clutch to cause the rotation of a shaft 281 which rotates the cams which close the CF contacts. To this end, the gear 28 (Fig. 12a) meshes with a gear 282 to which is attached the clutch disk 283 of said clutch to drive the shaft 281 one revolution for each clutch engagement. This energizing circuit for clutch magnet 280 is for the first machine cycle only. In subsequent card feed cycles the R4d relay contacts are open as will be explained but upon the presence of cards at the Presensing station the R3 relay will be energized to close the R3d contacts, through which relay contacts the impulse circuit to clutch magnet 280 is completed. After contacts 276 are closed at 144° of the second machine cycle or first card feed cycle, cam contacts CR34 close at 155° of the second machine cycle to transmit an impulse to the pickup winding of the R3 relay by an obvious circuit. R3a relay contacts then close to provide a stick circuit for the holding coil of the R3 relay by a circuit which extends back through R3a relay contacts, and CF4 cam contacts to line 272. CF4 extends the energization of R3 relay over and through the next or second card feed cycle. When R3d relay contacts close during this second machine cycle and CR1 contacts close during this and succeeding cycles, a circuit is completed to energize clutch magnet 280.

The start key will be held down or depressed the second time to reenergize R9 relay and the operation will be repeated to advance the card from the Presensing station to the first Control station and to feed the second or following card from the supply magazine into the feed rolls 50, 51 and thus to the Presensing station.

Energization of the R3 relay closes R3c contacts which, it will be recalled, are closed only when a card is at the Presensing station so as to complete at 165° a circuit during the second machine cycle or first card feed cycle from the line 272 through CR1 cam contacts, R3c relay contacts, R11b relay contacts now closed, to the clutch magnet 153. This clutch magnet, it will be recalled, causes the operation of the mechanism which closes the gripping devices to feed particularly the first card from the Presensing station to the Control station and other cards from station to station in the manner previously described.

Closure of cam contacts CF18 and 240° of the second machine cycle or first card feed cycle causes completion of a circuit from line 272 through cam contacts CF4 now closed, R3a relay contacts now closed, CF18 cam contacts to the pickup winding of the R4 relay. The latter will close the R4a relay contacts to complete a stick circuit for the holding winding of the R4 relay extending back through the R4a relay contacts and CF3 cam contacts to line 272. R4 relay will thereupon open the R4d relay contacts so that the impulse emitted by CR19 cam contacts to the CF cam clutch magnet 280 will be subsequently directed through the R3d relay contacts for card feed cycles after the first. During the third machine cycle or the second card feed cycle cam contacts CF19, which are timed to close slightly earlier than CF18, will close and complete a circuit from the line 272 through CF3 cam contacts, R4a relay contacts now closed, CF19 cam contacts to the pickup winding of the R5 relay. The latter closes the R5a stick contacts providing a stick circuit for the holding winding of the R5 relay extending back through R5a relay contacts and cam contacts CF2 to line 272. R5 relay closes R5b contacts which in conjunction with R3b contacts now closed provide an alternate holding circuit for the R9 relay to keep R9 energized when stick cam contacts CR4 for the R9 relay open. It will thus be noted that R4 relay is energized as the card is about to enter the Control station and that R5 relay will later close when the card is about to enter the Adding-printing control station. Relays R4 and R5 also control relay contacts which supply current to the read-out commutators shown in Fig. 3 and previously described in detail. Such circuit connection is not shown in the present wiring diagram since it is not involved in the presently described invention; but R4 and R5 are referred to only to designate the function of the R4 and R5 relay contacts.

Under normal card feed conditions and so long as cards continue to feed through the Presensing station, impulse circuits to the R3 relay will be reestablished during each machine cycle. Relay contacts R2a and R2b will remain closed as long as any cards remain in magazine, holding R4 and R5 after they have been energized. The card picker control clutch magnet 64, CF cam control clutch magnet 280 and gripper control clutch magnet 153 will also be reenergized each cycle under normal conditions so long as cards continue to feed through the machine.

However, failure to feed a card from the supply magazine to the Presensing station to close the contacts 276 will stop card feeding operations. Whenever the presensing card lever contacts 276 are opened, due to the failure of card feed from the magazine, the stick circuit to the hold coil of the R3 relay will be opened when test cam contacts CF4 open at about 162° of the card feed cycle in which there is a card feed failure. Deenergization of R3 relay enables the R3c contacts to open, and assuming that there are cards in the hopper which would cause the R1d contacts which are in multiple therewith to be opened, the impulse circuit to the gripper clutch control magnet 153 will be opened and it will not receive the impulse transmitted by the CR1 cam contact. The result of this is that the clutch controlled by the magnet 153 will not be engaged and the card grippers will not be closed and cards present at the Control station and the Adding-printing control station will remain in such position and will not be advanced. Also, deenergization of the R3 relay will cause the R3b relay contacts to open, and assuming that the R1b contacts are open due to the presence of cards in the hopper, the holding circuit of the R9 relay is deenergized upon opening of the CR4 contacts at about 227° of the cycle in which there is a card feed failure. R9 relay becoming deenergized opens its R9b contacts, preventing the energization of the auto start relay R10 when cam contacts CR3 close. R10b relay contacts thereupon open with the result that the impulse circuit to the R11 relay and the picker clutch control magnet 64 is opened and furthermore opening of the R3d relay contacts prevents the transmission of an impulse to the card feed cam clutch magnet 280. Since the clutch control magnets 153, 280, 64 for the three clutches will not be energized, all of the card feed operations will be terminated, thus signaling the operator that the card feeding operations have not been properly performed. Summarizing, during each cycle of operation test circuits function to determine whether a card has been properly fed by the picker blade and the feed rolls to the intermediate Presensing station.

It has been found in practice that most of card feed failures occur at the throat, particularly when cards have been damaged or worn to such an extent that they cannot be properly fed from the supply magazine. In such instance they may not feed through the feed magazine throat. When a card feed failure has been sensed, the feeding by the picker knife and the means for advancing the cards from station to station by the gripper devices, both of which are independently operated feeding operations, are inhibited. With the above condition which is enabled by the present invention, it is possible for the operator to examine the defective card which is easily performed by removing all cards from the hopper (and if necessary by elevating the upper portion of the card feed unit) and examining this card to determine whether it should be replaced or again placed in the machine for another feed thereof.

It is often possible to utilize the same card by "ironing" around the edge of the card with the fingernail to flatten out a burr which may be raised on the card by repeated feedings through the throat knife and block. The inhibition of the card feed from station to station and stopping of all the card feeds prevents functional operations to be effected under control of such cards, and preventing the splitting of card groups in the event that the defective card belongs to the same group as the already advanced cards. This insures that despite a card feed failure the reports will be properly recorded by the card controlled accounting machine.

When a defective card has been repaired or replaced this card is reinserted in the magazine, and other cards are placed on top of it in the usual manner. It is not ordinarily necessary for the operator to hinge open the upper section of the card feed unit except in the case of a card jam or misfeeding operation which occurs after the card has been advanced through the throat. Under normal conditions, a new card will be placed in the magazine, and the machine will be started by depressing the start key. The first card will be advanced by the picker knife and feed rolls to the advance sensing station as the circuits which energize the picker clutch magnet 64 and the card feed cam clutch magnet 280 will function in generally the same manner as described above for the condition encountered when cards are first inserted in the machine. It should be noted, however, that the gripper clutch magnet 153 cannot now function due to the opening of contact R3c. Previously fed cards will remain in position at the Control and the Adding-printing stations until the replaced card has been advanced to the Presensing station to take its place in the sequence required for normal machine operations, which will then be resumed as the clutch magnets 64, 283, and 153 will now operate every cycle in the usual manner.

In earlier types of machines the failure to feed a card at the throat caused the machine to carry out functions which would normally occur if the last card had been advanced through the machine with the result that only a portion of the cards in the group were tabulated and the machine would print a total which would not relate to the summation of the items of all the cards in the same group.

When all cards have been fed from the magazine, the contact 270 will be open, and relays R1 and R2 will be deenergized upon opening of CR36 late in the machine cycle, permitting contact R1d to close as the grippers must function to continue the feeding of the last cards to the stacker magazine. Contact R2d also closes to condition the machine for the operation of the clutch magnet 280 during the last two card sensing operations and also during initial cycles.

The contact R1b will close, and the machine will continue in operation, feeding the last card through the machine until the deenergization of R5 after the last card has been sensed at the Adding-printing station. This will result in the opening of contact R5b, deenergization of R9 and the subsequent deenergization of R10, and the opening of R10b, which will prevent re-engagement of the card feed cam clutch 280 or the picker clutch 64 after the last card has been sensed. While there will be additional and unnecessary operations of the picker knife and grippers, these are of no consequence under these conditions.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a machine of the character described, the combination of means for separately feeding cards from a supply magazine to a sensing position in a presensing station and at rest in such position, a feeling device for sensing the presence of a card in said presensing station, other independently operated means for feeding a card at rest in sensing position from said presensing station to a card analyzing station, and means controllable by said device for suppressing the operation of said independently operated card feeding means upon the failure of a card to be fed by said first named card feeding means to sensing position in said presensing station while enabling the feeding of a following card from said supply magazine to said presensing station.

2. In a machine of the character described, the combination of card picker means for separately feeding cards from a supply magazine to a presensing station, a feeling device for sensing the presence of a card in said presensing station, other reciprocally operated means operable independently of the card picker feeding means for feeding a card from said presensing station to a card analyzing station in a feeding stroke concurrent with feeding another card from said supply magazine, and means controllable by said feeling device for suppressing the card feeding stroke of the last named feeding means while enabling the operation of said card picker means upon the failure of a card to be fed by said first named card picker means to said presensing station, whereby a card already in said analyzing station remains at rest therein as the following card is fed from the supply magazine to the presensing station.

3. In a machine of the character described, the combination of means for separately feeding cards from a supply magazine to a rest position in a presensing station, a feeling device for sensing the presence of a card in said presensing station, other separately operated means for feeding a card from a rest position in said presensing station to a card analyzing station, means to effect the concurrent operation of both feeding means for each cycle of operation of the machine when said feeling device senses the presence of a card in said presensing station, and means controllable by said device for suppressing the operation of said last named card feeding means while enabling the subsequent operation of said first named card feeding means upon the failure of a card to be fed by said first named card feeding means to be sensed in said presensing station.

4. In a machine of the class described wherein a supply of cards are stacked in a supply magazine, means for separately feeding cards from said supply magazine to a rest position in a presensing station in a cycle of operation of the machine, means for sensing the presence of a card in said presensing station, means operated independently of the first named card feeding means for feeding a card from said presensing station to a first card analyzing station and a card in said first analyzing station to a second analyzing station in the same cycle of operation of the machine that a following card is fed to rest position in said presensing station by said first named card feeding means, and means controlled by said sensing means upon sensing the failure of a card to reach a sensing position in said presensing station to enable the operation of the first named card feeding means and conjointly prevent the operation of said independently operated card feeding means whereby cards already in one or both analyzing stations remain at rest therein as the following card is fed from the supply magazine.

5. In a machine of the class described wherein a supply of cards are stacked in a supply magazine, means comprising card picker means for separately feeding cards from said supply magazine to a rest position in a presensing station in a cycle of operation of the machine, means for sensing the presence of a card in said presensing station, independently operated gripper means for gripping a card in rest position in said presensing station and transporting it to a first card analyzing station and concurrently gripping a card in said first analyzing station for transport to a second analyzing station in the same cycle of operation of the machine that a following card is fed to said presensing station by said first named card feeding means, and means controlled by said sensing means upon sensing the failure of a card to reach said presensing station to enable the operation of the first named card feeding means but conjointly prevent the operation of said independently operated card gripper means whereby as the following card is fed from the supply magazine to said presensing station cards already in one or both analyzing stations remain at rest therein.

6. In a machine of the class described wherein a supply of cards are stacked in a supply magazine, means for separately feeding cards from said supply magazine to a rest position in a presensing station in a cycle of operation of the machine, means for sensing the presence of a card in said presensing station, independently operated means for feeding a card from said presensing station to a rest position in a first card analyzing station and a card in said first analyzing station to a rest position in a second analyzing station and a card in said second analyzing station to an eject position in the same cycle of operation of the machine that a following card is fed to said presensing station by said first named card feeding means, and means controlled by said sensing means upon sensing the failure of a card to reach said presensing station to enable the operation of the first named card feeding means but conjointly prevent the operation of said independently operated card feeding means whereby cards in one or both analyzing stations remain at rest therein as a following card is fed from the supply magazine to said presensing station.

7. In a machine of the class described wherein record cards are stacked in a supply magazine, means for separately feeding cards from said supply magazine to a presensing station, cyclically operable drive means for said card feeding means comprising a clutch and means to release said clutch for an engagement to cause a card feed operation, independently operated means comprising card grippers for engaging the side marginal edges of cards to feed a card from said presensing station to a first analyzing station and concurrently a card present in said analyzing station to a second analyzing station and a card present in said second analyzing station to an eject station, cyclically operable drive means for said independently operated card feeding means comprising a clutch and related means to release said clutch for an engagement, sensing means for sensing the presence of a card in said presensing station, and means to effect the operation of both clutch releasing means upon the presence of a card in the presensing station and upon sensing the absence of a card in the presensing station to suppress the operation of the second named clutch releasing means while enabling the release of the first named clutch.

8. In a machine of the class described wherein record cards are stacked in a supply magazine, means for separately feeding cards from said supply magazine to a presensing station, cyclically operable drive means for said card feeding means comprising a clutch and means to release said clutch for engagement to cause a card feed operation, independently operated means comprising card grippers for engaging the side marginal edges of cards to feed a card from said presensing station to a card analyzing station and concurrently a card in said analyzing station to an eject position, cyclically operable drive means for said independently operated card feeding means comprising a clutch and related means to release said clutch for engagement to cause a card feed operation by said grippers, sensing means for sensing the presence of a card in said presensing station, means to effect the operation of both clutch releasing means in each cycle of machine operation upon sensing the presence of a card in the presensing station, and means controlled by said sensing means upon sensing the absence of a card in the presensing station to suppress the operation of the second named clutch releasing means while enabling the operation of the first named clutch releasing means.

9. In a machine of the class described wherein record cards are stacked in a supply magazine, means for separately feeding cards from said supply magazine to a rest position in a presensing station, cyclically operable drive means for said card feeding means comprising a clutch and means to release said clutch for engagement to cause a card feed operation, independently operated means comprising card grippers for engaging the side marginal edges of cards to feed a card from rest position in said presensing station to a rest position in a first analyzing station and concurrently a card from said analyzing station to a rest position in a second analyzing station and a card from said second analyzing station to an eject position, cyclically operable drive means for said independently operated card feeding means comprising a clutch and related means to release said clutch for engagement to cause a card feed operation, sensing means for sensing the presence of a card in said presensing station, and means to effect the operation of both clutch releasing means upon sensing the presence of a card in the presensing station and upon sensing the absence of a card in the presensing station to suppress the operation of only the second named clutch releasing means.

10. In a machine of the class described, the combination of means for separately feeding cards from a supply magazine to a first card station, means comprising card grippers to transport a card from the first card station to an analyzing station, means to reciprocate said grippers to effect a card transport stroke and an idle return stroke for each cycle of operation of the machine, means to effect the closure of said grippers prior to the card transport stroke and open said grippers prior to the idle return stroke, means to operate said last named means comprising cyclically operable driving means and a selectively engageable clutch, and means to prevent the engagement of said clutch and consequently prevent the closure of the grippers upon the failure of the feed of a card from the supply magazine to said first card station.

11. In a machine of the class described, the combination of means for separately feeding cards from a supply magazine to a rest sensing position in a presensing station, a sensing device for sensing the presence of a card in said presensing station, means comprising card grippers to transport a card from the presensing station to an analyzing station, means to reciprocate said grippers to effect a card transport stroke and an idle return stroke for each cycle of operation of the machine, means to effect the closure of said grippers prior to the card transport stroke and open said grippers prior to the idle return stroke, means to operate said last named means comprising cyclically operable driving means and a selectively engageable clutch, means to effect the engagement of said clutch to cause the operation of said means which effects the closure and opening of the grippers, and means controlled by said sensing device upon sensing the failure of the presence of a following card in said presensing station to prevent the engagement of said clutch and consequently prevent the closure of the grippers.

12. In a machine for feeding perforated cards to position said cards for the purpose of analyzing the cards at rest and in an accurately aligned position, the combination of grippers for gripping the side marginal edges of said cards, means to effect the reciprocation of said grippers to effect a transport stroke and an idle return stroke, means to cause the closure of said grippers during the transport stroke and opening of said grippers during the idle return stroke, leaving the transported card free and floating in analyzing position, aligning means for the trailing and leading edges of said card comprising fixed cardstops engaging the trailing edge of the card when in correctly aligned analyzing position, and movable card shifting means for engaging the leading edge of the card, means to position said movable card shifting means to shift a disaligned card to abut said card stops, aligning means for the side marginal edges of the cards comprising means for coacting with said marginal edges of the card, and means for effecting the coaction of said last named aligning means with the side marginal card edges while the card is in free floating position to align the card with respect to its marginal edges.

13. In a machine for feeding perforated cards to position said cards for the purpose of analyzing the cards at rest and wherein the card is free and floating when transported to analyzing position, aligning means for the trailing and leading edges of said card comprising spring operated card stops depressed by the leading edge of the card but elevatable to card stop position for coaction with the trailing edge when the card is in analyzing position, and movable card shifting means for engaging the leading edge of the card, means to position said movable card shifting means while the card is in free floating position to shift a disaligned card to abut said card stops, aligning means for the side marginal edges of the cards comprising means for coacting with said marginal edges of the card, and means for effecting the coaction of said last named aligning means with the marginal card edges while the card is in free floating position to align the card with respect to its marginal edges.

14. In a machine for feeding perforated cards to position said cards for the purpose of analyzing the cards at rest and wherein the card is free and floating when transported to analyzing position, aligning means for the trailing and leading edges of said card comprising spring operated card stops depressed by the leading edge of the card but elevatable to card stop position for coaction with the trailing edge when the card is in analyzing position, and movable card shifting means out of the plane of the card and movable for engaging the leading edge of the card, means to position said movable card shifting means into the plane of the card while the card is in free floating position to engage the leading edge to shift a disaligned card to abut said card stops, and aligning means for the side marginal edges of the cards comprising means for coacting with said marginal edges of the card, and means for effecting the coaction of said last named aligning means with the marginal card edges while the card is in free floating position to align the card with respect to its marginal edges.

15. In a machine for feeding perforated cards to a free floating analyzing position to be analyzed at rest by a plurality of rows of analyzing devices, means for feeding a card to a free floating analyzing position to coordinate the rows of perforations with the rows of analyzing brushes, aligning means for the trailing and leading edges of the card comprising fixed stops coacting with the trailing edge of the card, and movable card shifting aligning means coacting with the leading edge of the card, aligning means for the side marginal edges of the card comprising means for coacting with the marginal edges of the card, and means for effecting the coaction of said last named aligning means with the marginal card edges while the card is in free floating position to align the card with respect to its marginal edges.

16. In a machine for feeding perforated cards to position said cards for the purpose of analyzing the cards at rest and wherein the card is free and floating when it has been transported to analyzing position, aligning means for the trailing and leading edges of said card comprising fixed card stops engaging the trailing edge of the card when the latter is in analyzing position, and movable card shifting means out of the plane of the card while it is being transported and movable to engage the leading edge of the card, means to position said movable card shifting means into the plane of the card while the card is in free floating position to engage the leading edge to shift a disaligned card to abut said card stops, aligning means for the side marginal edges of the cards comprising means for coacting with said marginal edges of the card, and means for effecting the coaction of said last named aligning means with the marginal card edges while the card is in free floating position to align the card with respect to its marginal edges.

17. In a machine of the class described, the combination of reciprocable means having a card transport stroke and a return stroke, a plurality of card grippers carried by said reciprocable means for gripping the side marginal edges of a card, means to effect a closure of each gripper to seize the associated marginal card edge comprising a related toggle lever system, means to latch each of said grippers against the action of the related operated toggle lever system, means to restore the operated toggle lever system of each gripper, and a single combined latch releasing means and toggle lever restoring means comprising means to disable the latch for the grippers when said reciprocable means is in one position prior to the card transport stroke to cause release of the toggle lever system and closure of said grippers to seize the marginal card edges, and when said reciprocable means is in another position prior to the return stroke to operate the toggle lever system restoring means to thereby restore the toggle lever system to open said grippers to release the hold on the marginal edges of the transported card.

18. In a machine of the class described, the combination of reciprocable means having a card transport stroke and an idle return stroke, a plurality of card grippers carried by said reciprocable means and each at a related sensing station, means to effect a closure of each gripper to seize the associated side marginal card edge comprising spring operated toggle levers, means to latch each of said grippers against the action of the related toggle levers, means to restore the operated toggle levers of each gripper, and means to disable the latch for the grippers prior to a card transport stroke of said reciprocable means to cause release of the toggle levers to a straight line position to effect closure of said grippers to seize the side marginal card edges of the cards at each sensing station, and means to operate the toggle lever restoring means to thereby position and restore the toggle levers to open said grippers to release the hold on the side marginal edges of the cards at said sensing stations prior to the idle return stroke of said reciprocable means.

19. In a machine of the class described, the combination of a plurality of card grippers, one at each card sensing station, means to reciprocate the grippers to effect a card transport stroke and an idle return stroke, means to effect a closure of each gripper to seize the associated side marginal card edge of a related card comprising spring operated toggle levers, means to latch each of said grippers against the action of the related toggle levers, means to restore the operated toggle levers of each gripper, and combined latch releasing means and toggle lever restoring means comprising means to disable the latch for the grippers to cause release of the toggle levers prior to a card transport stroke of the grippers to effect closure of said grippers to seize the side marginal card edges, and prior to the idle return stroke of said grippers to operate the toggle lever restoring means to thereby restore the operated toggle levers to open said grippers to release the hold on the side marginal edges of the previously transported cards.

GEORGE F. DALY.

REFERENCES CITED

The following references are of record in the file of this patent:

UNITED STATES PATENTS

| Number | Name | Date |
|---|---|---|
| 1,772,180 | Ford | Aug. 5, 1930 |
| 1,991,028 | Olson et al. | Feb. 12, 1935 |
| 1,991,729 | Brougham | Feb. 19, 1935 |
| 2,257,465 | Higginbottom | Sept. 30, 1941 |